US 7,792,870 B2

(12) United States Patent
Field et al.

(10) Patent No.: US 7,792,870 B2
(45) Date of Patent: Sep. 7, 2010

(54) IDENTIFICATION AND AUTOMATIC PROPAGATION OF GEO-LOCATION ASSOCIATIONS TO UN-LOCATED DOCUMENTS

(75) Inventors: Daniel Eugene Field, Calgary (CA); Daniel Eric Rose, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 285 days.

(21) Appl. No.: 11/270,889

(22) Filed: Nov. 8, 2005

(65) Prior Publication Data

US 2007/0112777 A1    May 17, 2007

(51) Int. Cl.
G06F 17/30 (2006.01)
G06F 15/16 (2006.01)

(52) U.S. Cl. .................. 707/802; 707/803; 707/804; 707/918; 707/919

(58) Field of Classification Search .................. 707/10, 707/104.1
See application file for complete search history.

(56) References Cited

U.S. PATENT DOCUMENTS

| | | | | |
|---|---|---|---|---|
| 5,848,373 A | * | 12/1998 | DeLorme et al. | 701/200 |
| 5,948,040 A | * | 9/1999 | DeLorme et al. | 701/201 |
| 6,600,817 B1 | * | 7/2003 | Shaffer et al. | 379/199 |
| 6,757,740 B1 | * | 6/2004 | Parekh et al. | 709/245 |
| 6,895,551 B1 | * | 5/2005 | Huang et al. | 715/205 |
| 2002/0032740 A1 | * | 3/2002 | Stern et al. | 709/206 |
| 2004/0030616 A1 | * | 2/2004 | Florance et al. | 705/27 |
| 2005/0216186 A1 | * | 9/2005 | Dorfman et al. | 701/207 |
| 2005/0262062 A1 | * | 11/2005 | Xia | 707/3 |
| 2006/0206624 A1 | * | 9/2006 | Wang et al. | 709/245 |

* cited by examiner

*Primary Examiner*—Tony Mahmoudi
*Assistant Examiner*—Brittany N McCue
(74) *Attorney, Agent, or Firm*—Hickman Palermo Truong & Becker LLP

(57) ABSTRACT

Systems and methods are provided for identifying pages that can be authoritatively, to some confidence level or another, associated with a geographic location, and are provided for grouping documents such that authoritative location associations can be propagated from pages with higher location confidence to pages with lower location confidence. Pages might be identified with authoritative indicators, groups of pages identified including at least one addressed page and at least one unaddressed page, wherein an addressed page is a page having a higher confidence level than an unaddressed page, and at least one processing step performed that is location specific. The confidence level assigned to a page as part of the process represents the confidence that the page is associated with an identifiable geographic location.

19 Claims, 9 Drawing Sheets

700

Restaurant of the Valley - Fine Dining in the Valley

Restaurant of the Valley

Lunch Menu

Appetizers

Salad

Potstickers — 702

Artichoke Cheese Dip and Chips

* * *

Home  About RotV  Lunch Menu  Dinner Menu  Wine List  The Staff
Directions  Contact Info  Reservations  Web Master  Feedback Copyright© 2005 Restaurant of the Valley Page 1 of 1                    http://www.<restaurant-domain>/lunch-menu.html

Fig. 7

Restaurant of the Valley - Contact Info

Restaurant of the Valley

We are located at
123 Main Street
Sunnyvale, CA 94089 } 810

For directions and a map, select the "Directions"
link at the left.

Telephone: (000) 000-0000
Facsimile: (000) 000-0000

E-mail: info@<restaurant-domain>
Website: http://www.<restaurant-domain>

Home
About RotV
Lunch Menu
Dinner Menu
Wine List
The Staff
Directions
Contact Info
Reservations
Web Master
Feedback

---

Home   About RotV   Lunch Menu   Dinner Menu   Wine List   The Staff
Directions   Contact Info   Reservations   Web Master   Feedback Copyright ©2005 Restaurant of the Valley Page 1 of 1                    http://www.<restaurant-domain>/main.html

Restaurant of the Valley - Web Master

Restaurant of the Valley

For problems with our website, please send an e-mail to: webmaster@<restaurant-domain>

Our website was designed and written by:

Web Designers
456 Main Street ⎫ 910
Anytown, CO 80000 ⎭

Home
About RotV
Lunch Menu
Dinner Menu
Wine List
The Staff
Directions
Contact Info
Reservations
Web Master
Feedback Home   About RotV   Lunch Menu   Dinner Menu   Wine List   The Staff
Directions   Contact Info   Reservations   Web Master   Feedback Copyright ©2005 Restaurant of the Valley Page 1 of 1                                  http://www.<restaurant-domain>/main.html

Fig. 9

IDENTIFICATION AND AUTOMATIC PROPAGATION OF GEO-LOCATION ASSOCIATIONS TO UN-LOCATED DOCUMENTS

BACKGROUND OF THE INVENTION

The present invention relates in general to search and indexing systems and methods and in particular to search and/or indexing systems wherein geographic locations are associated with documents and processing of those documents depends on their associated locations.

The World Wide Web (Web), as its name suggests, is a decentralized global collection of interlinked information—generally in the form of "pages" that may contain text, images, and/or media content—related to virtually every topic imaginable. A user who knows or finds a uniform resource locator (URL) for a page can provide that URL to a Web client (generally referred to as a browser) and view the page almost instantly. Since Web pages typically include links (also referred to as "hyperlinks") to other pages, finding URLs is generally not difficult.

What is difficult for most users is finding URLs for pages that are of interest to them. The sheer volume of content available on the Web has turned the task of finding a page relevant to a particular interest into what may be the ultimate needle-in-a-haystack problem. To address this problem, an industry of search providers (e.g., Yahoo!, MSN, Google) has evolved. A search provider typically maintains a database of Web pages in which the URL of each page is associated with information (e.g., keywords, category data, etc.) reflecting its content. The database might also index every significant word (i.e., all words except for stop words, such as "the", "a", "in", etc.) in each document. The search provider also maintains a search server that hosts a search page (or site) on the Web. The search page provides a form into which a user can enter a query that usually includes one or more terms indicative of the user's interest. Once a query is entered, the search server accesses the database and generates a list of "hits," typically URLs for pages whose content matches keywords derived from the user's query. This list is provided to the user as "search results".

In the more general case, a corpus of documents is searched and a search engine provides documents deemed responsive to a query. It should be understood that documents in a document corpus could be considered pages and that other divisions of digitized items of information could also be designated as documents or pages for the purpose of search.

In some cases, because of the large number of search results, it is desirable to filter out some of the results and only provide more relevant results. One filtering that is useful in many situations is to filter pages based on the searcher's location, so that the search results are skewed towards pages relevant to the searcher's actual location or specified location. This car be done by having page authors include metadata indicating the relevant locations of their pages, but mostly this is not done and is often difficult to otherwise assess a relevant "location" for a document.

It is sometimes desirable to be able to search for information that is associated with a physical location. A typical example might be to find all of the pizza restaurants within a five mile radius of one's current location. One approach is to find products and services within some local area using a location-specific directory (e.g., "electronic yellow pages"). The information contained in these directories is generally compiled manually and often does not make any connection between the product or service and its web pages (if any exist). The information in yellow pages products is prone to be incomplete and out-of-date; it is also generally expensive to maintain.

As another example, a user might be searching for a restaurant in Sunnyvale that serves pot stickers. The information might be available, such as where a restaurant puts up a web site having a contact page showing its address in Sunnyvale and a restaurant menu page listing items offered, such as pot stickers, but if the restaurant does not include "Sunnyvale" on its restaurant menu page, a search engine might not provide the menu in response to the query "Pot stickers in Sunnyvale".

An alternative to manually compiled yellow page data is to automatically extract similar information directly from pages on the web, thus eliminating expensive manual procedures. This can also result in more complete and timely data. One approach to this entails associating or tagging a geographical location to individual pages. Most pages do not contain any textual or other indication regarding the location of the item or items described on that page (or other such physical locus to be associated with the page). Due to the large number of pages in a typical corpus (the Web as a corpus includes billions of pages) as well as their ephemeral nature, manually labelling individual pages with locations would require a very large and continuous effort.

A typical technique for automatically associating a geographic location with a web page is to locate and parse any addresses contained within a page. However, an address mentioned in the text of a page may not actually represent the physical location of the items described on that page and many pages might have no explicit mention of an address.

Another common approach for associating a geographic location with a web page is to analyze whois or DNS information and attempt to relate IP address or hostname to a location. This method suffers due to inaccuracies in the registration data aLnd because it is often common for an Internet service Provider ("ISP") to host web sites in locations that are nowhere near the physical locations of the sites they host. The inaccuracy makes this technique generally infeasible.

There have also been attempts to utilize metatag conventions for the specification of physical locations for pages, but inaccuracies and lack of usage makes this technique generally infeasible.

It is known to impute search terms from one document to another so that a query of two or more terms is satisfied by a document that does not contain all of the terms of the query if its "parent" document(s) do contain the missing terms. See, for example, U.S. Pat. No. 5,991,756 assigned to Yahoo! Inc. and entitled "Information Retrieval from Hierarchical Compound Documents". While documents with a clear hierarchical organization can be easily searched using those techniques, it can be more difficult where it is not always clear which documents go with which documents or how authoritative the contents of one document is or when other inevitable ambiguities are present.

It would be desirable to provide a method and apparatus for "geo-locating" pages automatically whether or not the page authors provided suitable indications of location.

BRIEF SUMMARY OF THE INVENTION

Embodiments of the present invention provide systems and methods for identifying pages that can be authoritatively, to some confidence level or another, associated with a geographic location, and systems and methods for grouping documents such that authoritative location associations can be propagated from pages with higher location confidence to pages with lower location confidence.

According to one aspect of the present invention, a method for processing includes identifying pages with authoritative indicators, identifying groups of pages including at least one addressed page and at least one unaddressed page, wherein an addressed page is a page having a higher confidence level than an unaddressed page, and performing at least one processing step that is location specific. The confidence level assigned to a page as part of the process represents the confidence that the page is associated with an identifiable geographic location, with documents having a high confidence level being determined to be strongly associated with a particular geographic location while documents having a low confidence level being determined to be weakly associated with a particular geographic location or not associated at all with a geographic location.

In specific embodiments, geographic location might be specified by a fully qualified street address, a partially specified street address, a set of one or more map coordinates, a longitude/latitude, etc. In specific embodiments, identifying groups might include determining which pages belong to which websites, wherein a website is a collection of pages presumed to be under common control by an entity for a particular purpose. In specific embodiments, location specific processing might include filtering in or out pages based on their deemed location wherein their deemed location might be derived from an associated location of the pages or from an associated location of another page in the group or groups to which the page belongs (i.e., via location propagation).

The following detailed description together with the accompanying drawings will provide a better understanding of the nature and advantages of the present invention.

BRIEF DESCRIPTION OF THE DRAWINGS

FIG. 7 is an illustration of a Web page that includes links and a URL such that it might be grouped with the page shown in FIG. 6 and includes search terms of interest to searchers.

FIG. 8 is an illustration of a Web page that includes links, a URL such that it might be grouped with the pages shown in FIGS. 6-7 and includes an explicit indication of a street address that can be associated with the page.

FIG. 9 is an illustration of a web page that includes an explicit indication of a street address that should not be associated with the page nor should be propagated to other pages in the same group.

DETAILED DESCRIPTION OF THE INVENTION

Figure 1:
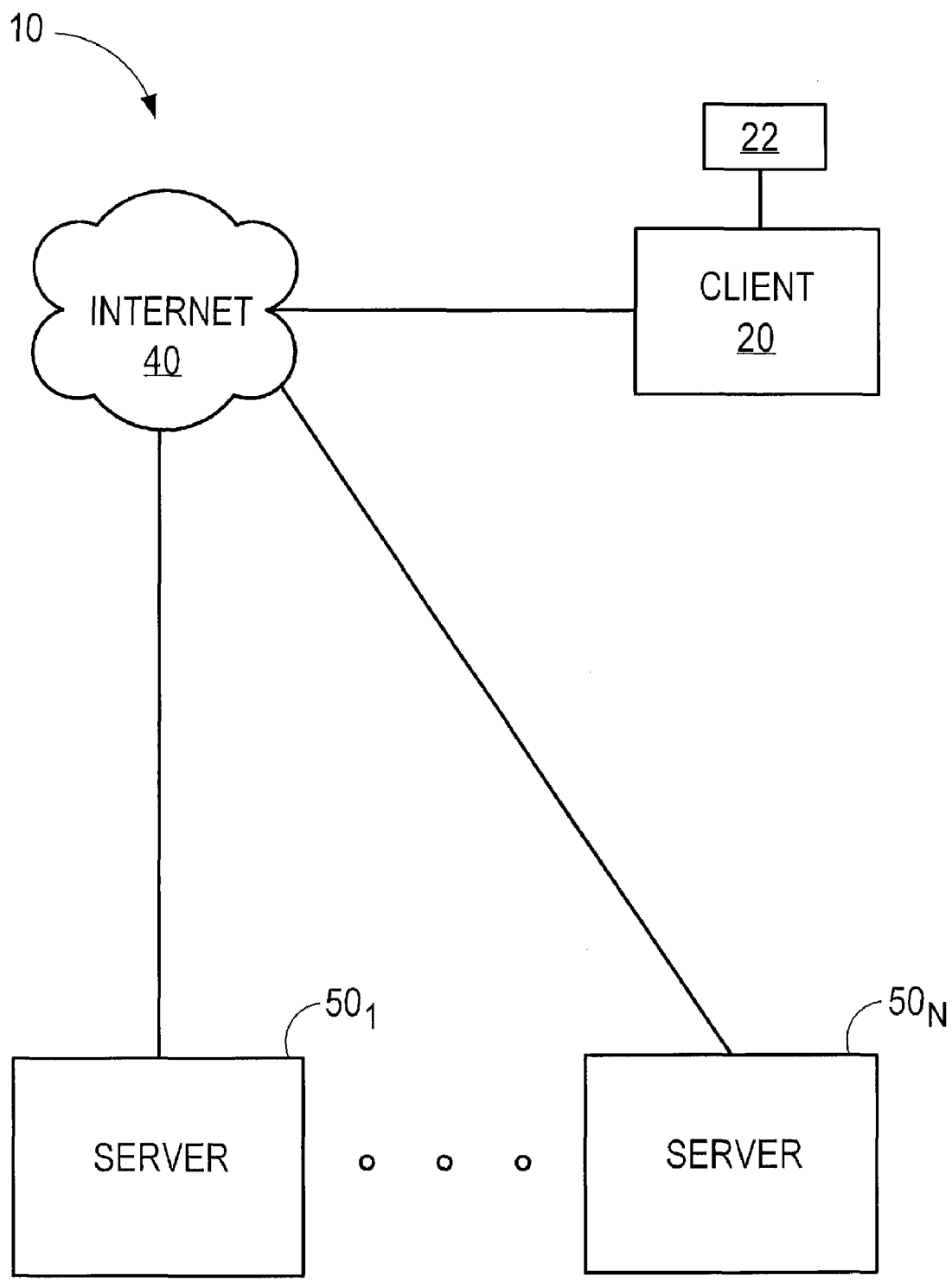
FIG. 1 is a high-level block diagram of an information retrieval and communication network according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers.

The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

Figure 2:
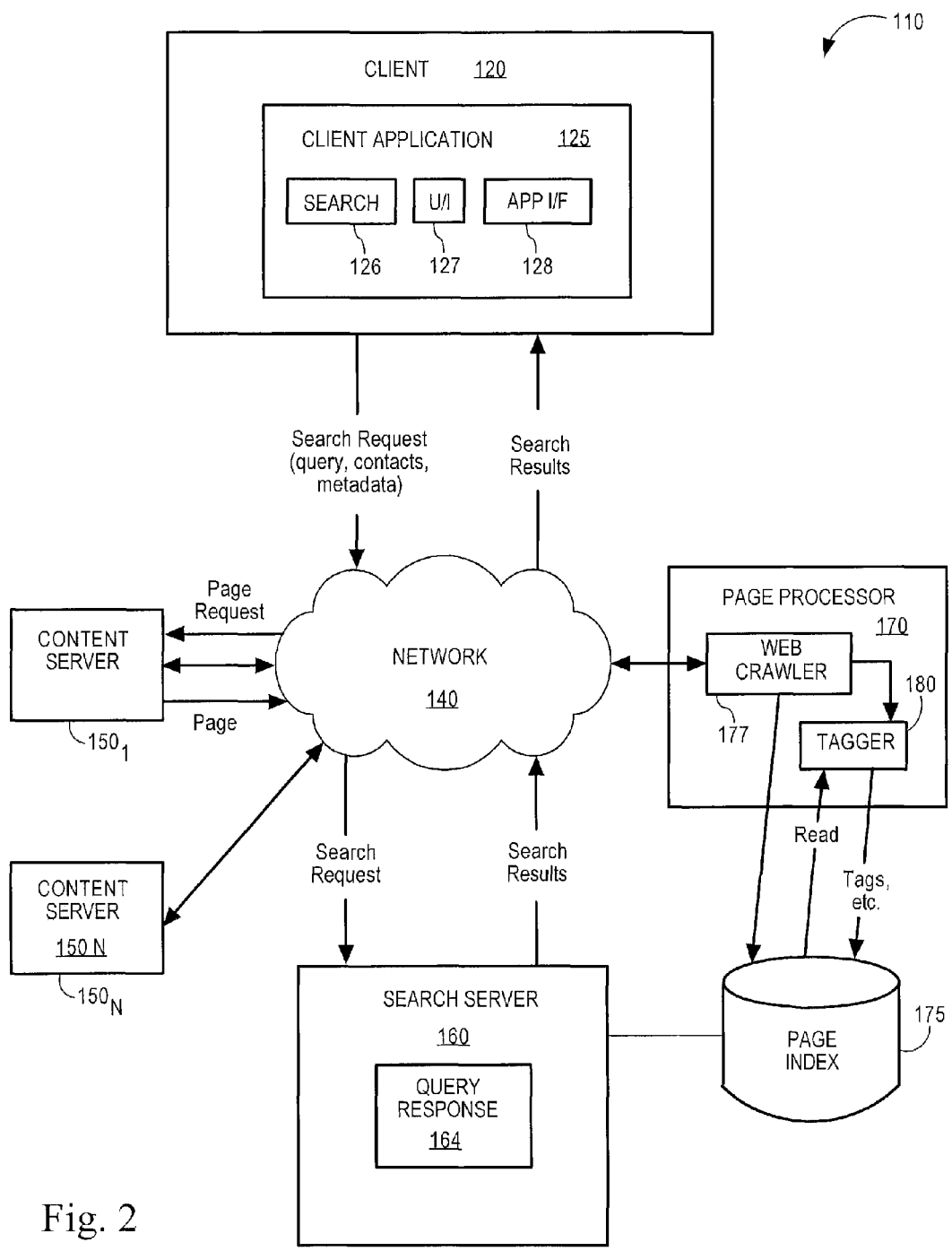
FIG. 2 is a block diagram of an information retrieval and communication network including a search engine according to an embodiment of the invention.

FIG. 2 illustrates an information processing system 110 usable with the network shown in FIG. 1. As shown, system 110 includes a client system 120, one or more content server systems 150, a search server system 160 and a page processing system 170. In system 110, client system 120 is communicably coupled through Internet 140 or other communication network to server systems 150 and 160, while page processing system 170 is preferably also coupled to content server systems 150 via Internet 140 or otherwise. It should be understood that at least some content server systems 150 might be directly coupled to page processing system 170, as might be the case where the content and page processing is supported by the same organization. As discussed above, client system 120 and its components are configured to communicate with server systems 150 and 160 and other server systems over Internet 140 or other communication networks.

According to one embodiment, a client application (represented as module 125) executing on client system 120 includes instructions for controlling client system 120 and its components to communicate with server systems 150 and 160 and to process and display data content received therefrom. Client application 125 may be transmitted and downloaded to client system 120 from a software source such as a remote server system (e.g., server systems 150, server system 160 or other remote server system), or client application module 125 may also be provided on any software storage medium (floppy disk, CD, DVD, etc.) that is readable by client system 120 as discussed above. For example, in one aspect, client application 125 may be provided over Internet 140 to client system 120 in an HTML wrapper including various controls such as, for example, embedded JavaScript or Active X controls, for manipulating data and rendering data in various objects, frames and windows. Client application 125 might also be provided as part of the operating system or otherwise preinstalled on client system 120.

Client application module 125 might include various software modules for processing data and media content. In one embodiment, these modules include a specialized search module 126, a user interface module 127, and an application interface module 128. Specialized search module 126 is configured for processing search requests (also referred to herein as queries) to be sent to search server 160 and search result data received from search server 160. In an alternative embodiment, general purpose software and interfaces are used to obtain search queries from the user and to send them along to search server 160. For example, a user might execute a browser application, navigate to a search query entry page (such as the example shown in FIG. 5 described in more detail below), enter a search query and have the search query sent to search server 160 alone or along with user metadata (cookies, browser settings, etc. and/or user context information).

User interface module 127 is configured for rendering data and media content in text and data frames and active windows, e.g., browser windows and dialog boxes. In some embodiments, user interface module 127 includes or communicates with a browser program, which may be a default browser configured on client system 120 or a different browser. Application interface module 128 is configured to support interfacing and communicating between client application 125 and various other applications executing on client 120, such as e-mail applications, instant messaging (IM) applications, browser applications, document management applications and others. It should be understood that various interfaces are available for obtaining queries from the user and presenting search results deemed responsive to those queries.

User interface module 127 advantageously provides user input interfaces allowing the user to enter queries for processing by search server system 160. For example, where user interface module 127 includes or communicates with a browser, the user may be able to enter a URL or activate a control button to direct the browser to a Web search page (or site) from which the user can submit a query to search server system 160 for processing. In addition or instead, user interface module 127 may include a search toolbar or other interface via which the user can enter and submit a query without first navigating to the search page. Queries entered using user interface module 127 may be preprocessed by specialized search module 126 prior to being sent to search server system 160, e.g., to remove so-called "stop words" ("the," "and," etc.), to correct spelling errors, or the like.

According to one embodiment, search server system 160 is configured to provide search result data and media content and/or references thereto (generally "search results") to client system 120, and content server system 150 is configured to provide data and media content, such as web pages, to client system 120, for example, in response to links selected by the user in search result pages provided by search server system 160. In some variations, search server system 160 returns content as well as, or instead of, links and/or other references to content.

In general, search system 160 identifies pages, etc., from an index that are deemed responsive to the user's submitted query and available context information (e.g., the user's identity, history, demographics and the like), typically returning a list of references to pages deemed responsive to the query, possibly ranked and presented in ranked order and/or filtered according to filtering criteria. It may be that some pages deemed responsive are not actually responsive to the user's query, but preferably the search results are such that users feel that at least some of the pages are indeed responsive to the user's query.

Search server system 160 is shown coupled to a page index 175 and it should be understood that the search server system might interface to more than one page index. Page index 175 is populated with, e.g., pages, links to pages, data representing the content of indexed pages, etc. Page index 175 might be populated by page processing system 170, another system, or both. Page indexes may be generated by various collection technologies such as an automatic web crawler 177; in addition, manual or semi-automatic classification algorithms and interfaces may be provided for classifying and ranking web pages within a hierarchical category structure and/or adding metadata to the index for selected or all pages.

In one embodiment, an entry in page index 175 includes a search term, a list of references (e.g., URLs or other encoded identifiers) to all pages in which that term appears and one or more metadata elements including tags such as a geographic location tag ("geotag"), a confidence level value and a group identifier for the page. It should be apparent that a page index can be not all inclusive and not depart from the essence of the inventions described herein. Thus, embodiments can work with partial page indices.

A tagger 180 might review the output of web crawler 177 and generate tags such as geotags for documents that the web crawler identifies. Alternatively, tagger 180 might tag documents that are already referenced in the page index.

Search server system 160 is configured to provide data deemed responsive to various search requests received from a client system 120, in particular from search module 126 and/or user interface module 127. For example, search server system 160 may include a query response module 164 that is configured with search related algorithms for identifying and ranking Web pages relative to a given query, e.g., based on a combination of logical relevance (which may be measured by patterns of occurrence of search terms in the query), context identifiers, page sponsorship, etc.

Ranking and/or filtering might be done based on geotags. For example, if the search system knows that a user is located at a particular address (either actually located there or assigned that location by some user action such as the user indicating his or her current or deemed street address or other geographic indicator), then the search system might increase page rankings of pages that have geotags that are proximate to the user's location. Thus, if the user specifies a street address and asks for "restaurants" and indicates a desire for a location specific search (a "local search") or such indication is assumed, the search system might filter out search results with geotags indicating a far distance from the user's location.

The user's location need not be the user's actual location, but it can be. For example, client system 120 might be provided with a Global Positioning System (GPS) module that would provide, in electronic form, an indication of the user's present location. Alternatively, the user might specify another address, such as when the user is at work and is using a computer to look up movie show times for theaters near the user's home some distance away. In that case, the user might select a previously saved location labeled "home" and signal to the search engine that such location is to be used as the geographic locus for the search.

It will be appreciated that the search system described herein is illustrative and that variations and modifications are possible. The content server(s), search server, page processing system and page index may be operated by a single organization, e.g., a distributed server system such as that provided to users by Yahoo! Inc., or they may be operated by disparate organizations.

Each server system generally includes at least one server and an associated database system, and may include multiple servers and associated database systems, and although shown as a single block, may be geographically distributed. For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably.

The search server system may be configured with one or more page indexes and algorithms for accessing the page index(es) and providing search results to users in response to search queries received from client systems.

Figure 3:
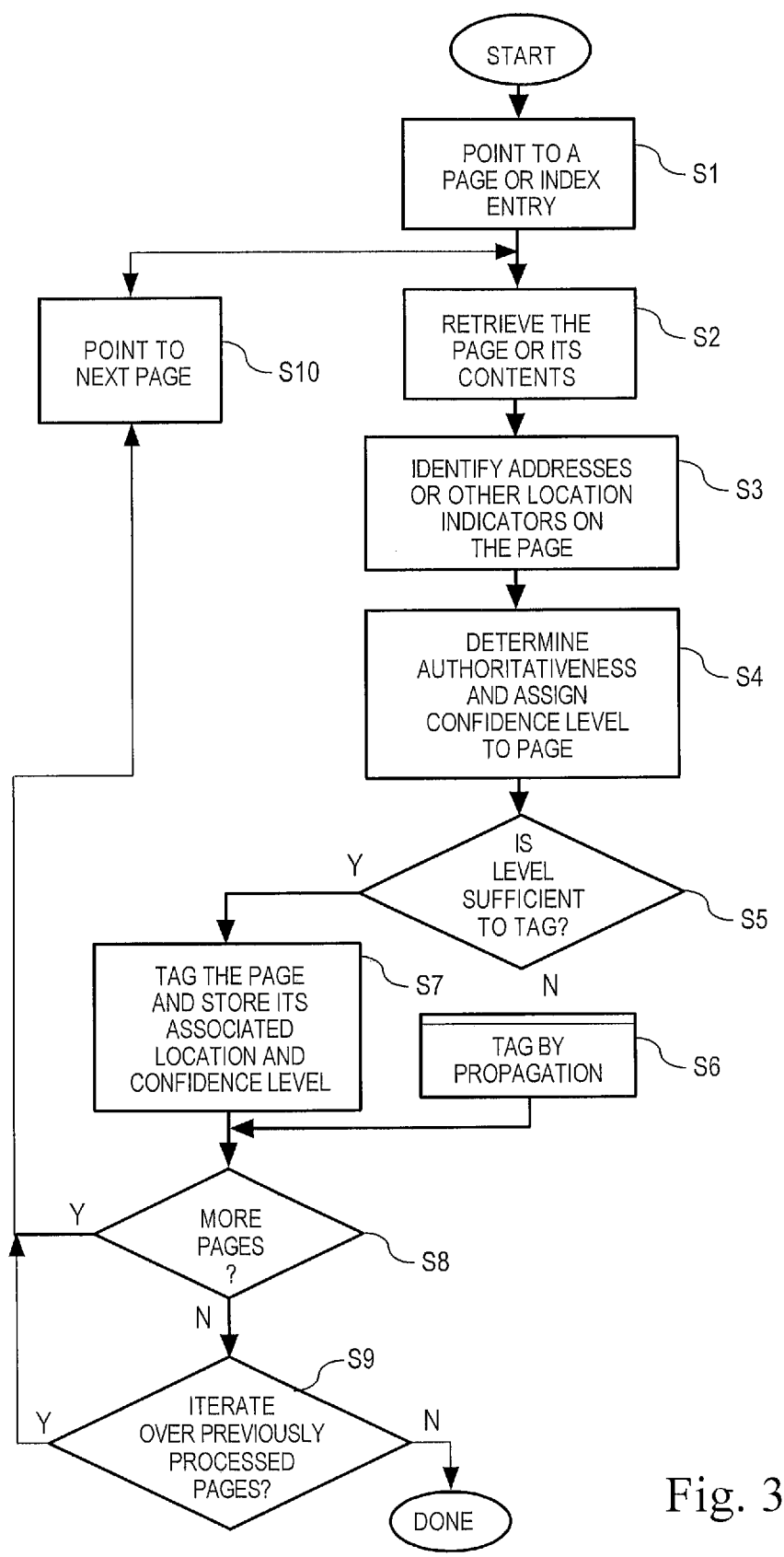
FIG. 3 is a flowchart of a process performed by a tagging system to tag pages with associated location tags.

FIG. 3 is a flowchart of a process performed by a tagging system to tag pages with associated location tags. It should be appreciated that the processes shown by flowcharts described herein are illustrative and that variations and modifications should be apparent to one of ordinary skill in the art. Steps described as sequential may be executed in parallel, the order of steps may be varied, and steps may be modified or combined. Various steps may be automated or performed manually. In one alternative embodiment, a search provider may provide a context processing module (that might include indexing and/or tagging functions) that can be installed and run on the content provider's system.

The process shown in FIG. 3 is one example of a process of identifying pages that can be authoritatively, to some confidence level or another, associated with a geographic location, and, where appropriate, propagating those associations to other pages in a group. Once tagged, a system such as a search system might perform processing that depends on the tags, such as filtering in or out pages in a set of search results depending on the tags and/or based on their deemed location wherein their deemed location might be derived from an associated location of the pages or from an associated location of another page in the group or groups to which the page belongs (i.e., via location propagation). Other processing might include logging or analyzing searches and/or results.

The process will now be described as might be performed by a tagger, such as that shown in FIG. 2. The tagger might be implemented in software, hardware, firmware or a combination, in a centralized computing system or in a distributed computing system or modules.

As shown, in step S1, the tagger points to a page or catalog entry (directly or indirectly), then retrieves (step S2) the page, the page's contents or at least some of the page's content or representation of the page's content. From that, possibly using methods described in detail below, the tagger attempts to identify geographic identifiers on the page (or whatever is retrieved and available for that page) (S3). As examples, the tagger might identify a street address from displayed text of the page, a location metatag in the document, etc.

Once the tagger identifies an address or other location identifier, it may then determine an authoritativeness of the location and assign a confidence level to the page (S4). For example, if a page has a title "Contact Information" and the text of the page includes only one instance of a text sequence that matches an address expression, then the confidence level might be set high, whereas a page with a title "Member Address Directory" having hundreds of text sequences that match an address expression might be given a low confidence level, or even a zero confidence level, wherein a zero confidence level might be the level to which pages having no known location indicators are assigned.

The tagger then determines whether the confidence level is high enough to warrant tagging (S5). If not, the page might be tagged by propagation (S6; see FIG. 4). If the level is sufficient, the tagger could store (S7) the location and confidence level in association with the page, such as by storing it in a page index record in fields allocated for this purpose. The tagger might then check if more pages need to be tagged or considered (S8). If not, the tagger might consider whether iteration is needed (S9). Iteration might be useful where pages are processed in an order and an earlier processed page is grouped and/or linked to a later processed page. If the earlier page does not have an associated location and a location is assigned to the later processed page, one or more iterations might be in order so that the earlier processed page can be processed again, this time associating it with the location associated to the later processed page.

In any case, if there are no more pages and no more iterations, the process is done. Otherwise, the tagger proceeds to step S10, pointing to a next page for processing and loops back to step S2.

The confidence level assigned to a page as part of the process represents the confidence that the page is associated with an identifiable geographic location, with documents having a high confidence level being determined to be strongly associated with a particular geographic location while documents having a low confidence level being determined to be weakly associated with a particular geographic location or not associated at all with a geographic location. Geographic location might be specified by a fully qualified street address, a partially specified street address, a set of one or more map coordinates, a longitude/latitude, etc. Identifying groups might include determining which pages belong to which websites, wherein a website is a collection of pages presumed to be under common control by an entity for a particular purpose.

Figure 4:
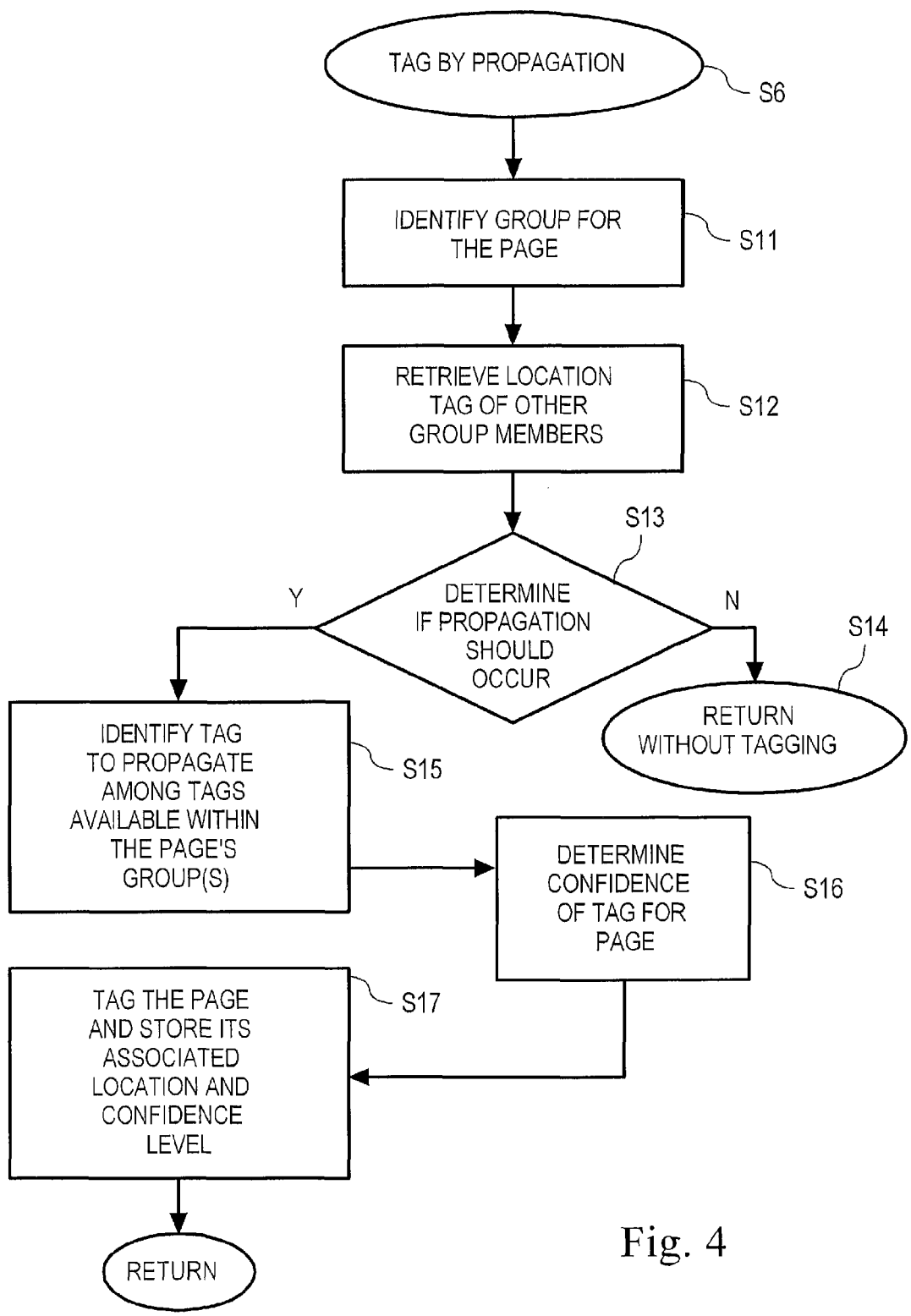
FIG. 4 is a flowchart of a subprocess of the process shown in FIG. 3, wherein the subprocess includes propagating tags when appropriate.

FIG. 4 is a flowchart of a subprocess of the process shown in FIG. 3, wherein the subprocess includes propagating tags when appropriate. As shown there, a tagger processing a page might identify a group of which the page in question is a member (S11) and then retrieve geotags of other members of that group (S12). A page might belong to one or more groups. An example of a group are all the pages having a particular base URL (wherein a "base URL" is such that the pages with the same base URL have at least part of their domain and/or directory path in common), or are determined to be part of a common website. A "group" can comprise a single page.

Once the group is identified and geotags of other pages are determined, the tagger determines if geotag propagation should occur (S13). Examples of such decision making are described below. If propagation should not occur, the subprocess returns without tagging (S14). Otherwise, the tagger identifies the tag to propagate among the available tags within the pages of the group (S15). Once a tag to propagate is found, its confidence value is determined (S16). A tag's confidence value can be determined by a process that considers both the previously tagged page's confidence and the propagation process. For example, suppose the tagger is propagating a tag from page X to page Y. If the propagation happened because there is a link from Y to X with the text "Our Address," then the confidence assigned to Y might be 100% of the confidence assigned to X. On the other hand, if the propagation was simply because they are both pages with the same root, then the confidence of Y will be lower than confidence in X. Once the confidence level of a page is determined, then the tagger tags the page in question, possibly by storing its associated geotag and confidence level (S17) and returns.

Figure 5:
FIG. 5 is an illustration of a Web page usable with a search process.

FIG. 5 is a Web page that a searcher might use for entering in a search query. In a typical embodiment, a search system provides the Web page shown to a searcher's client system, which displays the search entry Web page. The searcher types in his or her search request (and this can all be done by an automated searcher) and the searcher's client system submits the search request to the search system, possibly also along with searcher context information (e.g., user ID, cookies, etc.). The search system then performs a search and returns search results to the searcher's client system, which then typically displays the results. Pages that might be found in the page index of the search system are illustrated in FIGS. 6-8.

Figure 6:
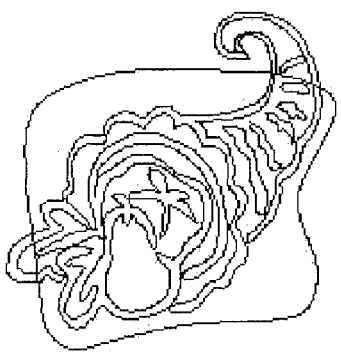
FIG. 6 is an illustration of a Web page that includes links but lacks explicit indication of a geographic location to associate with the page.

FIG. 6 is an illustration of a Web page 600 that includes links but lacks explicit indication of a geographic location to associate with the page. As should be apparent, page 600 does not contain any explicitly displayed geolocation information. However, it can be identified as a root page for a particular domain, as indicated by its URL 610, which in this case is "http://www.<restaurant-domain>/main.html", a URL for a fictional restaurant. A tagger might trigger on hyperlink anchors such as link 620, as it matches the expression "contact info", and group page 600 with other pages found by following that link. One other link of note on page 600 is link 630 ("Lunch Menu"). Although not shown in the figures, it is assumed herein that the underlying HTML source for page 600 would indicate that the underlined text "Lunch Menu" is anchor text for a link pointing to http://www.<restaurant-domain>/lunch-menu.html (note that these URLs are intended to be examples of fictional web pages) and the underlined text "Contact Info" is anchor text for a link pointing to http://www.<restaurant-domain>/contact.html.

FIG. 7 is an illustration of a Web page 700 that includes links and a URL such that it might be grouped with the page shown in FIG. 6. In this example, assume that link 630 (from FIG. 6) is a reference to the page 700, i.e., it points to "http://www.<restaurant-domain>/lunch-menu.html". This page also does not have explicitly displayed geolocation information, but it does have a link 620 with anchor text "Contact Info", which might be a trigger to group page 700 with page 600. Note that page 700 includes text 702 representing an appetizer that a user might be searching for ("pot stickers"), but no indication of an address of where the product is available.

FIG. 8 is an illustration of a Web page 800 that includes links, a URL such that it might be grouped with the pages shown in FIGS. 6-7 and includes an explicit indication of a street address 810 that can be associated with the page. In this example, assume that link 620 (from FIG. 7) points to "http://www.<restaurant-domain>/contact.html", i.e., page 800 shown in FIG. 8.

Using a heuristic rule that pages having "addresses" in their names will have address information with high likelihood and another rule that pages hierarchically above such address information pages at the same domain are pages where geotag propagation is likely warranted.

As an example of an address that should not be propagated, consider the illustration of a Web page 900 in FIG. 9. Assume that this page is linked with page 600 (FIG. 6) in that the source for page 600 includes a link wherein "Web Master" is the anchor text 640 for the link and the link points to http://www.<restaurant-domain>/webmaster.html, i.e., page 900 shown in FIG. 9. As should be apparent, although that page has a street address 910 on it, that street address should not normally be propagated to other pages on the website, as that is not an address associated with the proprietor of the web site.

DETAILED EXAMPLES

Having described above a general system, additional details of specific examples and variations will now be presented. Consider an example of locating a home page for a business that has a website comprising a plurality of pages. Websites often contain a page that defines the address of a business owning that site. Other pages on the site might not contain any addresses. Using methods and/or apparatus described herein, pages of a website that likely contain the address of the business can be found and, if such an address is found, an association for that address can be propagated with the information on that page, and on to the rest of the pages of the website. The location can be specified by geographical coordinates, street addresses, etc. Street address analysis might be performed using country-specific rules, to account for varying formats for street addresses.

In an example process, two major components are implemented. The first is an automatic mechanism that locates a page in a website collection that serves as a physical location proxy for the content of the rest of the site. The second component comprises the automatic association of the address found in the first component with the rest of the pages in the website.

In a specific example of the first component, two steps are used to locate a page serving as a location proxy for the rest of the site. The first is to find all pages whose final URL path component contains the case insensitive substring "CONTACT". The set of such pages is referred to as C. The number of addresses contained in the text of each page is determined. If there is only one page in C with exactly one address within its text, then this step succeeds and the address on this page is referred to as $A_C$. The second step is to examine the top-level page for the site. The top-level page for a site is one whose URL does not contain any path components other than one of the standard default names (e.g., index.html, main.asp, etc.). If the top level page contains a single address within its text, then this step succeeds and the address on this page is referred to as $A_T$.

If both steps succeed, then $A_C$ and $A_T$ are tested for equality. If they are equal, then this address is referred to as A. If they are not equal, then preference is given to $A_C$ and this address is referred to as A. If either but not both steps succeed, then the address found (either $A_C$ or $A_T$) is referred to as A. In any of these cases, the entire first component is deemed to succeed. If neither of these steps succeeds, then the entire component is deemed to fail.

If the first component fails, then the entire method of address propagation fails for this site. Otherwise, the association of address A found in the first component is propagated to all of the pages on this site. Two pages are considered to be in the same site if their URLs contain the same hostname, or other criteria for grouping might be used. In this example, the group members are the pages of a website; other groups might be formed instead.

What follows is an example of a process for assigning addresses to pages that do not contain addresses, thus propagating geotags. The following procedure may be used to produce address propagation and tagging:

1. For each page being indexed, repeat the following:
   1.1. Parse and recognize each address on the page.
   1.2. Use a classification procedure to determine if the page is an authoritative address (AA) page.
   1.3. If it is an AA page:
      1.3.1 Tag the page with the recognized address(es) and assign the highest possible confidence score.
      1.3.2 Create an entry for the page in the AA table, containing the address(es)
   1.4 If it isn't an AA page:
      1.4.1 For each outlinked neighbor (page that this page links to), do the following:
         1.4.1.1 Look up the neighbor in the AA table
         1.4.1.2 If the neighbor is in the table, use a classification procedure to determine whether address propagation should occur.
            1.4.1.2.1 If yes, tag the page with the neighbors address, using a confidence score determined by the classification procedure.
2. Iterate as needed if neighboring pages that have authoritative addresses might not have been tagged before the current page.

The above procedure might require functionality of the tagger that is provided externally, such as by a web search engine, including a way to get a list of pages that link to a given page, together with their anchor text, and a way to get a list of pages linked to by a given page.

The "AA classification procedure" mentioned in step 1.1 may be implemented as a simple set of rules, such as "If this page is a root page for this site and contains exactly one address, it is an authoritative address page." In step 1.3.1, the tagger may reduce the confidence score based on the number of addresses on the page. The "propagation classification procedure" mentioned in step 1.4.1.2 may also be implemented as a simple set of rules, such as "if the anchor linking this page to the neighbor page contains the text 'contact,' then propagate the address." Once an AA table has been created, it may be used in successive indexing passes to eliminate the need for step 2. Also, the AA table may be implicitly constructed by the addition of metadata for each page in a search engine database.

A website might be all pages whose URL refers to the same hostname, but sometimes that is not appropriate. For example, some ISPs often group many logical sites within a single hostname, and this might need to be taken into account. By examining contact and top-level documents mentioning a single address, and attempting to propagate these addresses to related documents on the same host as appropriate, locations can be determined for pages that do not have location information. In addition, address information from a set of known metatag conventions might be included to assist with the process.

An example of address identification will now be described. Assume that locations within the United States are of interest. Text might be flagged as a potential U.S. address using regular expressions, rules, heuristics, or the like. For example, a rule might be that any recognized U.S. town or city name, followed by a state name or its official abbreviation, followed by a five or nine digit number is deemed an address. Regular expression processors or more specialized programs and/or hardware might be used to implement the components described herein, such as an address identifier component. The address identifier component might modify pages as they are processed, to assist with further processing, such as by adding tags to the pages. Preprocessing might also be done, such as to convert encoding to UTF8, perform language recognition, convert to HTML format, etc.

Processing can be done on the displayed text of a page of the HTML source for the page. Preprocessing might include a text-processing framework that performs the tasks such as 1) replace each SGML entity construct (e.g., "&") with its Unicode equivalent character, 2) remove certain non-text breaking HTML tags entirely, 3) replace some text-breaking HTML tags (e.g., break) with space characters, 4) replace other text-breaking HTML tags (e.g., header, table, paragraph) with special in-band break characters, 5) replace all non-alpha and non-numeric Unicode characters except '/' with space characters, 6) perform Unicode upper to lower case folding, and 7) tokenize the resulting character stream into sequences of white-space separated character runs.

Note that the appearance of the special in-band break character and '/' characters cause a new token to be emitted, which is useful to discontinue any potential address match.

The resulting stream of tokens is then examined for the appearance of a U.S. address. Each token is first examined to see if it includes either a five or nine digit number potentially signifying the occurrence of a U.S. zip code. If the immediately preceding one or two tokens represents one of the fifty state names or the District of Columbia or their official 2-letter abbreviations, then a potential address match continues. The address identifier might use a dictionary-based longest-phrase recognizer to look backwards through the tokens immediately preceding the state name or abbreviation, possibly considering synonyms using common abbreviations ("Beach" vs. "Bch", "Street" vs. "St.", etc.). If a potential match fails, then the process repeats itself starting with the token following the previously matched potential zip code.

It is likely that relaxing the requirement that the address contain a five or nine digit suffix would increase the number of U.S. addresses that could be recognized. However, this might not improve the tagging process as there might be numerous references to U.S. city/town names followed by state namnes appearing in free text that do not represent a street address that should be used for geotagging purposes. In order to ensure that such an occurrence is a true address reference, at least partial recognition of a street address as the prefix of the town or city name might be used as a rule, but that might be somewhat error-prone and time consuming.

"Geotagging" in General

A tagger, such as one that might be part of a larger search system and/or web or document indexing system, scans pages to determine whether an address or other geographic location indicator is present and if so "geotags" it accordingly. The tagger also determines whether that geotag can be propagated to other pages with no such indicator present (or only unreliably present) when those other pages share membership in a group with the geotagged page. In addition to determining if a page has a good location, the tagger might determine the location. For example, it might determine a street address and validate that address. The tagger might also use an address look up system (such systems are known in the art) to convert a parsed street address into longitude/latitude or other map coordinates.

"Geotagging" Via Contact Pages

A contact page is one whose primary purpose is to provide authoritative contact information (including street address) for the organization or author of the web site—there is often only one such page for a site. In one contact page identification component, candidate pages were pages whose final path component of the URL contains the case-insensitive substring "contact" and contains a single US address. It is possible that greater accuracy may achieved if incoming links are required to have anchor text containing the substring "contact" or the like before they are considered contact pages.

"Geotagging" Via Top-Level Pages

Top-level URLs often serve as entrance pages for an entire web site. They often contain definitive information about the entire site including its location. In one page identification component, pages are deemed to be candidate authoritative address pages if they are "top-level" pages, i.e., do not contain any path components other than a standard default names (e.g., index.html, main.asp, etc.) and they contain a single U.S. street address.

"Geotagging" Via Metatags

In addition to address determination using the above components, HTML metatags might also be used, such as ICBM, DC.Coverage, and Geo.Position metatags. In some emibodiments, geotags inferred from metatag information would be flagged such that the geotags would not be propagated to referring pages, as the intent or purpose of the document might not be as a contact-type page. Additionally, such metatags might be added to situate the author of a document rather than its content.

V. Further Embodiments

As has been described above, a search engine might consider tags in filtering and/or ranking search hits, wherein the tags include geotags representing authoritative geographic location information. Geotags can be propagated such that an addressed page having an address might provide address information for an unaddressed document through the association of the documents. Other location specific processing on such propagated addressed documents might be done as well. The authoritative geographic location information might comprise street addresses, longitude and latitude, map coordinates (such as grid letters/numbers), etc. The authoritative geographic location information might also comprise relative distances from predefined points, wherein predefined points might include a geographic location associated with a searcher or indicated as a preference item by the searcher, distance from a predefined path, containment within a political boundary (e.g., it is a page associated with a particular city, state, nation), or containment within a commercially defined region. As an example of the latter, pages might be tagged, through propagation or directly, with neighborhood labels assigned to geographic regions by a real estate industry group or census bureau such that those tags can be used for evaluating and/or searching real estate and/or neighborhood-based real estate information. Performing location specific processing might comprise filtering and/or ranking search results comprising a plurality of documents using propagated authoritative geographic locations for the documents in the plurality of documents.

While the invention has been described with respect to specific embodiments, one skilled in the art will recognize that numerous modifications are possible. For instance, where specific input devices (e.g., computer mouse) are referred to herein, it is to be understood that different input devices (e.g., keystrokes or voice commands) can be substituted. Similarly, clickable buttons and other graphical user interface control elements referred to herein may be replaced by any suitable alternative control elements.

As another example, instead of (or in addition to) processing search results for filtering and/or ranking, location-specific processing might include handling pages differently to account for different local customs and different time zones, etc. For example, suppose a user is searching the Web for computer manufacturers anywhere in the world that might be presently available for a telephone call and the computer manufacturers' web pages are in a different language than that of the user. By determining a location for each, or at least some, web pages in search results, they can be translated to the user's language (i.e., a page geolocated in a French city during a search by an English-speaking user can be translated using a French-English translator). As another example, if the web page contains hours of operation, those can be converted to the user's local time zone so that the user only sees search results for pages indicating that the business is open at the user's local time.

The embodiments described herein may make reference to Web sites pages, links, and other terminology specific to instances where the World Wide Web (or a subset thereof) serves as the search corpus. It should be understood that the systems and processes described herein can be adapted for use with a different search corpus (such as an electronic database or document repository) and that results may include content as well as links or references to locations where content may be found.

In addition, the invention has been described with reference to computer systems having particular hardware and software elements. It is to be understood that other systems with different combinations of hardware and/or software components could also be implemented.

Thus, although the invention has been described with respect to specific embodiments, it will be appreciated that the invention is intended to cover all modifications and equivalents within the scope of the following claims.

What is claimed is:

1. A computer-implemented method of tagging documents comprising:

maintaining, on a storage medium, data that establishes associations between documents that belong to a corpus of documents, and geographic location information;

identifying documents, within the corpus, that contain authoritative geographic location information, such documents being addressed documents;

updating the data to cause the data to reflect an association between each addressed document and the authoritative geographic location information contained in the addressed document;

identifying groups of documents, wherein at least one identified group of documents includes at least one addressed document and at least one unaddressed document, the at least one unaddressed document being a document that contains either no authoritative geographic location information or unauthoritative geographic location information;

for at least one unaddressed document in the at least one identified group, establishing the at least one unaddressed document as a propagated-addressed document by updating said data:
  (a) to cause the data to reflect an association between the at least one unaddressed document and authoritative geographic location information obtained from one or more addressed documents in the at least one identified group, and
  (b) to include a confidence level that represents the confidence that each addressed document and each propagated-addressed document is associated with authoritative geographic location information, performing location-specific processing on at least one such propagated-addressed document; and using the authoritative geographic location information to determine local customs or time zones, wherein the location-specific processing takes into account said local customs or time zones, wherein the confidence level is based at least in part on the link structure among the at least one unaddressed document and the group of documents, wherein geographic location information is obtained by processing the displayed and untagged text, wherein the authoritative geographic location information is associated with a proprietor of both the addressed documents and the propagated-addressed documents, and wherein the method is performed by one or more computing devices.

2. The method of claim 1, wherein authoritative geographic location information comprises street addresses.

3. The method of claim 1, wherein authoritative geographic location information comprises longitude and latitude.

4. The method of claim 1, wherein authoritative geographic location information comprises map coordinates.

5. The method of claim 1, wherein authoritative geographic location information comprises relative distances from predefined points.

6. The method of claim 5, wherein predefined points include a geographic location associated with a searcher.

7. The method of claim 5, wherein predefined points include a geographic location indicated as a preference item by a searcher.

8. The method of claim 1, wherein authoritative geographic location information comprises distance from a predefined path.

9. The method of claim 1, wherein authoritative geographic location information comprises containment within a political boundary.

10. The method of claim 1, wherein authoritative geographic location information comprises containment within a commercially defined region.

11. The method of claim 10, wherein commercially defined regions are neighborhoods.

12. The method of claim 11, wherein neighborhoods are geographic regions defined for purposes of evaluating or searching (a) real estate or (b) neighborhood-based real estate information.

13. The method of claim 1, wherein addressed documents are documents identified as top-level pages of a website.

14. The method of claim 1, wherein addressed documents are contact documents generated for the purpose of providing contact information.

15. The method of claim 1, wherein the documents are web pages and identifying groups of documents comprises identifying web pages that are share membership in pages of a website.

16. The method of claim 1, wherein the documents are web pages and identifying groups of documents comprises comparing URLs of the web pages.

17. The method of claim 1, further comprising ranking search results for a plurality of documents, based, at least in part, on authoritative geographic location information associated with the plurality of documents.

18. The method of claim 1, further comprising filtering search results for a plurality of documents, based, at least in part, on authoritative geographic location information associated with the plurality of documents.

19. One or more storage media storing instructions which, when executed by one or more computing devices, cause performance of the method recited in claim 1.

* * * * *